US005879516A

United States Patent [19]

Kasman

[11] Patent Number: 5,879,516

[45] **Date of Patent: *Mar. 9, 1999**

[54] KUGELROHR OR DISTILLATION APPARATUS

[76] Inventor: David H. Kasman, 19 Ridge Rd., Holliston, Mass. 01746-6402

[ * ] Notice: This patent issued on a continued prosecution application filed under 37 CFR 1.53(d), and is subject to the twenty year patent term provisions of 35 U.S.C. 154(a)(2).

[21] Appl. No.: 610,160

[22] Filed: Feb. 29, 1996

[51] Int. Cl.[6] .................... B01D 3/08; B01D 3/42

[52] U.S. Cl. .................... 202/238; 202/160; 202/173; 202/206; 203/2; 203/49; 203/100; 203/DIG. 2; 203/DIG. 18; 219/400; 219/521; 392/360; 392/365; 392/379; 392/382

[58] Field of Search .................... 202/173, 238, 202/224, 206, 185.3, 160; 126/19 R, 21 A, 273 R; 219/391, 385, 413, 521, 400, 386, 412; 203/2.1, DIG. 2, DIG. 18, 71, 49, 100; 159/DIG. 42; 392/379, 382, 360, 365

[56] References Cited

U.S. PATENT DOCUMENTS

| | | | |
|---|---|---|---|
| 3,219,099 | 11/1965 | Hamlow et al. | 202/238 |
| 3,736,916 | 6/1973 | White | 219/391 |
| 4,176,267 | 11/1979 | Rueggeberg | 219/10.55 A |
| 4,182,946 | 1/1980 | Wayne et al. | 219/10.55 A |
| 4,313,786 | 2/1982 | Smith | 159/22 |
| 4,326,497 | 4/1982 | Guibert | 126/261 |
| 4,488,933 | 12/1984 | Claunch et al. | 202/83 |
| 4,790,911 | 12/1988 | Parkinson | 202/205 |
| 4,826,575 | 5/1989 | Karamian | 259/DIG. 26 |
| 4,913,777 | 4/1990 | Parkinson | 203/DIG. 2 |
| 5,235,962 | 8/1993 | Doty et al. | 126/21 A |
| 5,656,170 | 8/1997 | Henderson | 210/656 |

FOREIGN PATENT DOCUMENTS

| | | | |
|---|---|---|---|
| 302852 | 4/1971 | U.S.S.R. | 392/360 |
| 1267963 | 3/1972 | United Kingdom | 202/238 |

OTHER PUBLICATIONS

Asco, Rota Film Still Arthur Smith Co. Jun. 1957.

*Primary Examiner*—Virginia Manoharan
*Attorney, Agent, or Firm*—Cesari and McKenna, LLP

[57] ABSTRACT

Improved kugelrohr or apparatus for distilling or separating liquids. It includes a rugged, reliable air oven and drive unit with numerous safety features. One or more external guards eliminate burn hazard and risk of accidental contact. A thermal isolation support isolates the oven from its rest surface. A grounded heating element eliminates shock hazards. The oven is fitted with a grommet or bushing to support a flask connected to one or more additional flasks in a series. The outlet of the last flask in the series is connected to a drive tube via a flexible coupling. The drive tube is connected to a rotary bearing assembly mounted on a drive unit. The oven and the flasks may include impellers for circulating air to enhance heating efficiency.

13 Claims, 3 Drawing Sheets

KUGELROHR OR DISTILLATION APPARATUS

BACKGROUND OF THE INVENTION

1. Field of the Invention

The present invention relates generally to the field of laboratory equipment and, more specifically, to apparatus for distilling or separating liquids.

2. Discussion of the Related Art

A device known in the art as a "kugelrohr apparatus" is used to distill or separate a liquid sample in preparation for analytical testing. One such apparatus, which has been commercially available from Aldrich Chemical Company, Inc. of Milwaukee, Wis. for many years, consists of several major components: an air oven; a number of round bottom flasks which are connected together in a series; a drive unit; a vacuum source; and an ice bath. A liquid sample is placed in one of the flasks which, in turn, is placed inside the air oven with the neck (outlet) of the flask extending through the sidewall of the oven and connecting with the next flask in the series. The outlet of the last flask of the series is coupled to the drive unit and the vacuum source. The ice bath is placed beneath the flasks between the oven and drive unit. As the oven heats the sample, the drive unit rotates the flasks back and forth in an oscillating motion to prevent violent boiling and uneven heating. The sample (or components thereof) evaporates and is drawn from one flask to the next in succession while being cooled by the ice bath. The vapor condenses, becoming a distillate which may then be collected for analysis.

Conventional kugelrohr apparati suffer from numerous safety and performance deficiencies. For example, in the Aldrich Chemical device referenced above, the air oven is constructed from an aluminum coffee pot having a removable glass top. The bottom of the coffee pot is fitted with a threaded, ungrounded (lamp type) electrical receptacle. Thus, when the receptacle is empty while the power is on, line voltage is present in the receptacle and represents a shock hazard.

An ungrounded heating element is usually screwed into the receptacle. Because the heating element is exposed within the interior of the coffee pot and operates at a high temperature (i.e., the element is red hot), there is a substantial burn hazard to personnel who must reach into the pot to insert or remove flasks. The aluminum sidewalls of the coffee pot, as well as its glass cover, also represent burn hazards.

Another disadvantage of the modified coffee pot oven arises from the fact that the heating element and electrical receptacle are unsealed. Thus, in the event that a flask should break and release liquid into the interior of the oven, the heating element will likely be ruined, liquid may be ignited or enter the receptacle and cause a short, and the entire oven will probably be damaged beyond repair.

Also, the drive unit of a conventional kugelrohr apparatus suffers from several disadvantages. Typically, such drive units use 1940's-vintage windshield wiper motors to provide back and forth rotation of the connected flasks. Such motors are disadvantageous because they are no longer in wide use and cannot easily be replaced or repaired. Further, such motors require compressed air or vacuum as a power source, neither of which may be readily available in many instances. Lastly, the conventional drive unit was not free-standing, but instead required an external support such as ring stand and clamp.

SUMMARY OF THE INVENTION

In brief summary, the present invention provides an improved apparatus for distilling or separating liquids with greatly enhanced safety and convenience, as well as more reliable operation.

In a preferred embodiment, the invention provides an improved air oven featuring external guards to reduce the risk of burns or accidental contact, a sheathed, grounded heating element which is sealed within the oven, and a thermal isolation support which isolates the oven from its base and a rest surface. The temperature of the oven may be controlled by either an open loop or close loop method. Optional impellers may be provided to circulate air within the oven, thereby increasing heating efficiency.

The invention also provides an improved drive unit which is constructed from reliable, serviceable components and is capable of operating with various sizes of flasks. The drive unit features a high torque electric motor and a rotary bearing assembly which enables maintenance of a very high vacuum while allowing the flasks to continuously rotate.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF ILLUSTRATIVE EMBODIMENTS

Figure 1:
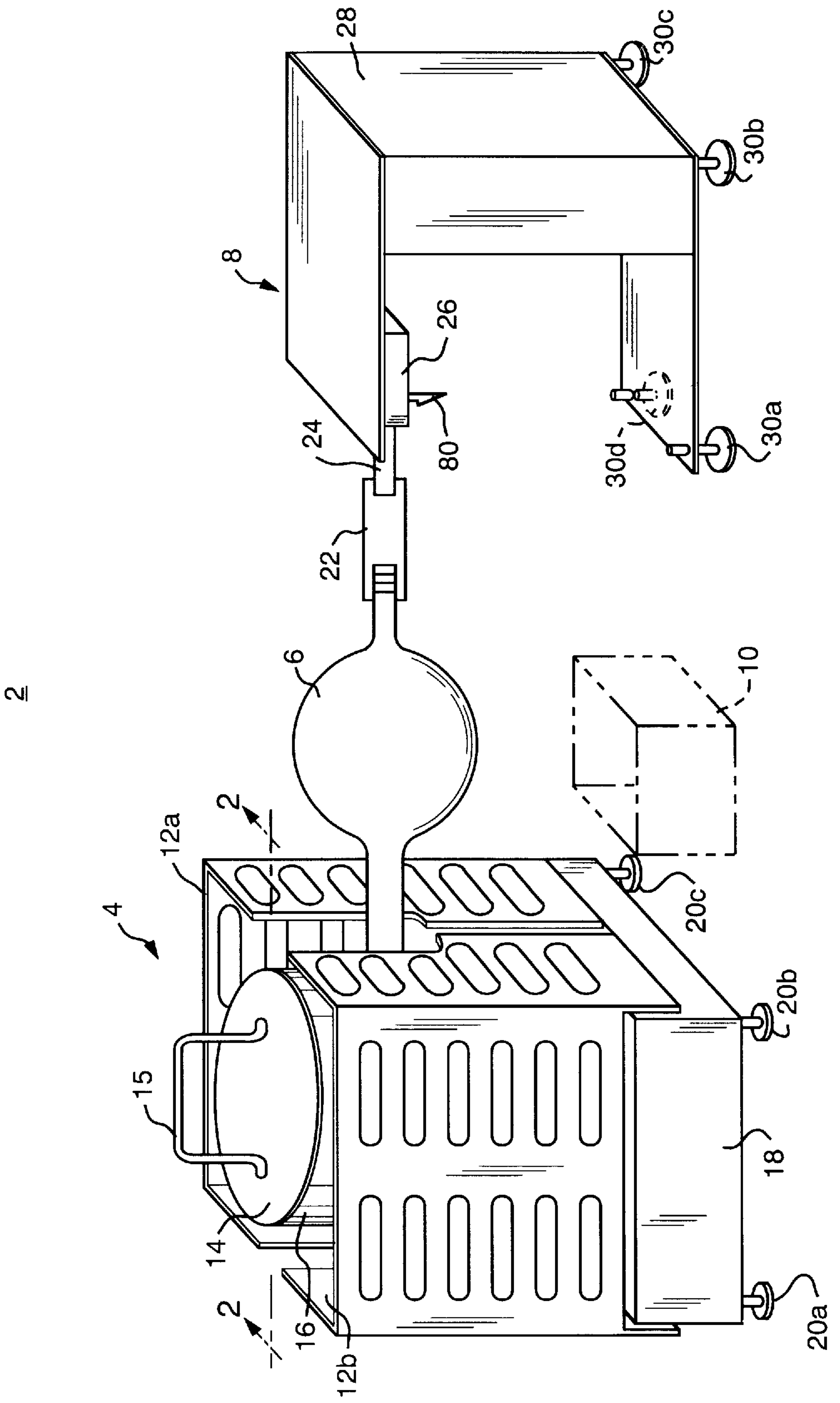
FIG. 1 is a perspective view of a distillation apparatus constructed in accordance with a preferred embodiment of the present invention.

FIG. 1 shows a distillation apparatus 2 whose major components are an air oven 4, a series of round bottom (glass) flasks 6 (one of which is not visible since it is disposed within oven 4) and a drive unit 8. An optional ice bath 10, shown in phantom, may be located beneath flask 6.

Air oven 4 includes a cylindrical heating chamber 16 mounted on a base 18 having height-adjustable feet 20*a*–20*d*. The top of heating chamber 16 is covered by a removable cover 14 having an over-sized loop handle 15. Vented guards 12*a* and 12*b* are arranged around the periphery of chamber 16.

A flexible coupling 22 connects an outlet of flask 6 to a drive tube 24. Drive tube 24 is connected to a rotary bearing assembly 26 mounted on drive unit 8. Housed within an enclosure 28 of drive unit 8 is a conventional high-torque, one-direction electric gear motor (not shown), one type of which is commercially available from W.W. Grainger, and a conventional electric cooling fan (not shown), which is commercially available from Advanced Air International, Inc. Drive unit 8 is supported by height-adjustable feet 30*a*–30*d*.

Heating chamber 16 is preferably constructed from a seamless, polished stainless steel canister having an open top and a closed bottom. Cover 14 and handle 15 are preferably also constructed from polished stainless steel.

Cover 14 may include an optional viewing window. Guards 12*a* and 12*b* and base 18 are preferably constructed from aluminum.

Drive unit 8 is preferably free-standing and constructed from aluminum. Coupling 22 is preferably constructed from vacuum hose which is sufficiently flexible to compensate for stresses or misalignment between flask 6 and drive tube 24, yet strong enough to resist collapsing under high vacuum. Drive tube 24 is preferably constructed from stainless steel.

Figure 2:
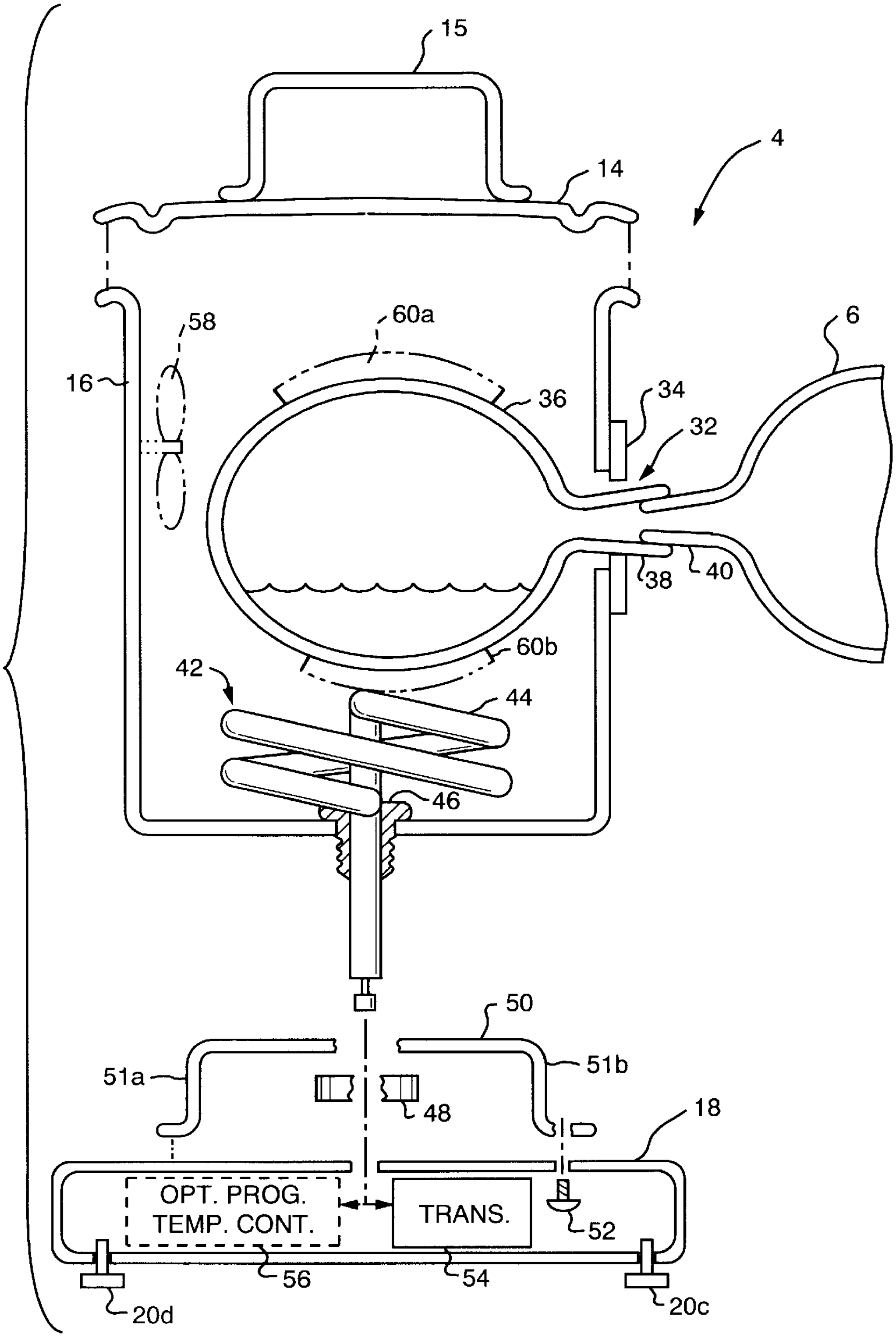
FIG. 2 is an enlarged, cross-sectional view, taken along line 2—2, of the air oven of FIG. 1.

FIG. 2 is a cross-sectional view, taken along line 2—2, of the air oven 4 of FIG. 1 (with guards 12*a* and 12*b* omitted for improved clarity). The sidewall of heating chamber 16 contains an aperture 32 which is fitted with a grommet or bushing 34 for supporting an outlet 38 of sample-holding flask 36 such that flask 36 may rotate freely, as described below. Outlet 38 is joined with inlet 40 of flask 6 by a conventional friction-type coupling (e.g., glass-on-glass with silicone grease or other material as a sealing agent) which may be augmented by an external clamp (not shown).

A heater assembly 42 includes a sheathed, grounded, helical heating element 44, a liquid-tight connector 46 disposed in an aperture in the bottom of heating chamber 16, and a nut or similar fastener 48 for securing chamber 16 to a thermal isolation bracket 50, which, in turn, is secured to base 18 by a plurality of fasteners 52. Preferably, heating element 44 is designed or selected such that its surface area is as large as practical, thereby enabling the element's sheath (i.e., the portion which a person might accidentally contact) to remain at a cooler, safer temperature, yet still provide ample heating.

To increase the heating efficiency of chamber 16, optional impellers may be provided. Impeller 58, which is driven by upwardly rising heated air or by an external motor (not shown), may be mounted in a variety of locations on the interior sidewall of chamber 16 provided there is sufficient clearance around flask 36. Alternatively, impellers (fins) 60*a* and 60*b* may be attached to or formed as integral parts of flask 36 such that as flask 36 rotates, impellers 60*a* and 60*b* cause circulation of air within chamber 16.

Within the interior of base 18, a variable transformer 54 or an optional programmable temperature control 56 is provided to control the temperature of chamber 16. A suitable variable transformer 54 is commercially available from Staco Electric Products. It should be understood that variable transformer 54 could also be located external to air oven 4. Such a transformer operates to control the temperature of chamber 16 in an open loop fashion. That is, by increasing or decreasing the output voltage of the transformer which is applied to heating element 44, one may increase or decrease the temperature within chamber 16. By constructing chamber 16 from polished stainless steel as noted above, the chamber is thermally lossy and tends to heat quickly and reach a stable temperature when controlled in this fashion.

Alternatively, a programmable temperature control unit 56 may be used to control the temperature of chamber 16. A suitable control unit 56 is commercially available from Watlow Controls. Such a control unit, when coupled with a conventional temperature sensor (e.g., a thermocouple) located within chamber 16, operates in a closed loop fashion to control the temperature of chamber 16.

Thermal isolation bracket 50 is preferably constructed from stainless steel with substantial apertures located in its sides 51*a* and 51*b*. This arrangement has been found to provide very good thermal isolation between heating chamber 16 and base 18, thus preventing excessive heat from damaging components housed within base 18 or a rest surface on which oven 4 is placed.

Figure 3:
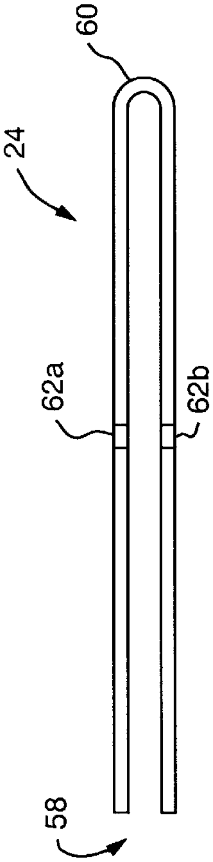
FIG. 3 is an enlarged, cross-sectional view of the drive tube shown in FIG. 1.

FIG. 3 shows drive tube 24 in enlarged cross-section. Drive tube 24 has an open end 58, which is normally connected to flexible coupling 22 (FIG. 1), and a closed end 60, which is normally inserted into (and protrudes outward through a central aperture in an end cap 78 of) rotary bearing assembly 26. Near the middle of drive tube 24 are opposed through-holes 62*a* and 62*b*. Holes 62*a* and 62*b* permit a vacuum to be applied to the interior of drive tube 24 and, in turn, to the series of flasks coupled to open end 58 thereof. Drive tube 24 is preferably constructed from stainless steel.

Figure 4:
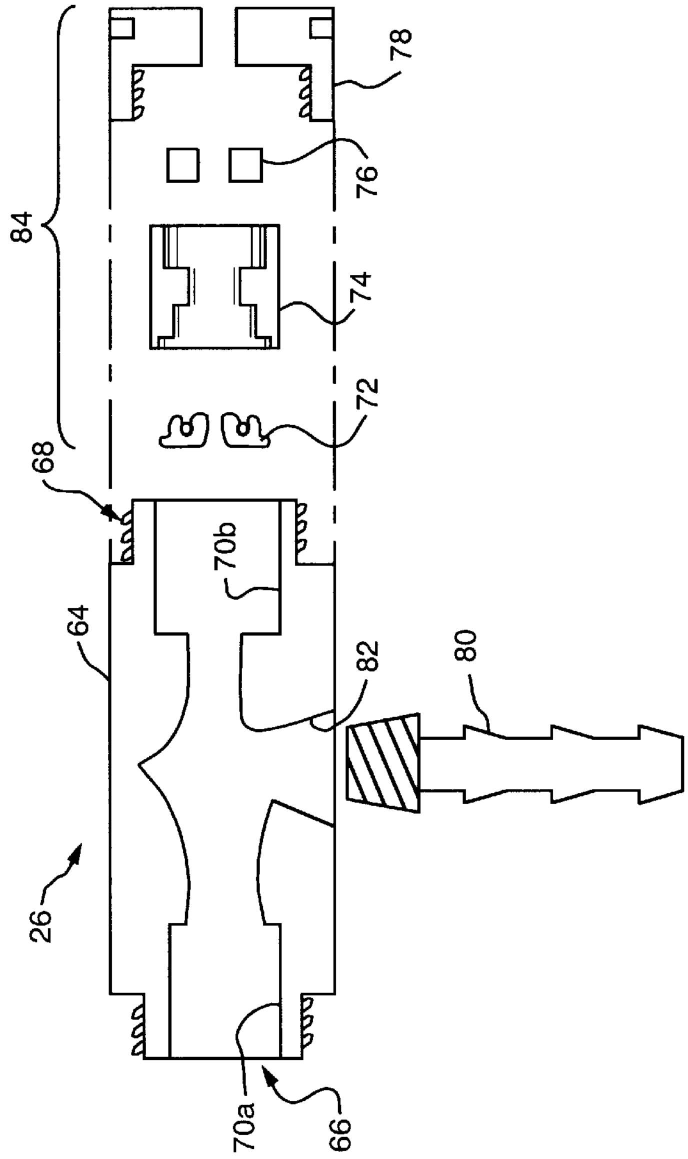
FIG. 4 is an enlarged, exploded, cross-sectional view of the rotary bearing assembly used in the drive unit of FIG. 1.

FIG. 4 shows rotary bearing assembly 26 in enlarged, exploded cross-section. A bearing main body 64 includes first and second threaded ends 66 and 68. A recessed area 70*a* is formed within the first end 66 and a similar recessed area 70*b* is formed within the second end. A threaded end cap 78 is normally screwed onto each end 66 and 68 (one end cap is omitted for improved clarity).

Each of recessed areas 70*a* and 70*b* is shaped and dimensioned to receive the combination 84 of a seal 72, a seal carrier 74 and a bearing 76. (Combination 84 is omitted from end 66 for purposes of enhanced clarity.) Each seal 72, seal carrier 74 and bearing 76 has a central aperture through which drive tube 24 passes.

Main body 64 also includes a tapered, threaded aperture 82 into which a hose barb 80 is screwed. TEFLON® tape or similar material may be applied to the pipe threads of hose barb 80 to ensure an airtight seal. A source of vacuum (not shown) is normally attached to hose barb 80.

Each of seals 72 has two primary functions: to maintain an airtight seal around drive tube 24, and to be able to withstand exposure to potentially corrosive or caustic vapors drawn under vacuum from flask 6. It has been found that good performance of both functions is attainable by constructing seals 72 from a commercially available part, sold under the trademark BAL-SEAL®, which has a TEFLON® portion with a spring embedded therein. The TEFLON® material is highly resistant to chemical attack and the embedded spring provides a constrictive force which helps to maintain an airtight seal with drive tube 24. Thus, drive tube 24 is effectively sealed at each end of main body 64, thereby enabling a very high vacuum, on the order of 0.1 mm Hg, to be maintained The primary function of bearings 76 is to physically support the (rotating) load represented by flask 6, flexible coupling 22 and drive tube 24. Bearings 76 are preferably constructed from RULON® which provides a smooth, low friction surface that requires no lubrication.

Main body 64, seal carrier 74 and end cap 78 are all preferably constructed from stainless steel.

Rotary bearing assembly 26 may advantageously be disassembled as needed for replacement of any of its components. Thus, for example, in the event a bearing 76 should wear out, it may easily be replaced by simply removing the adjacent end cap 78.

With reference once again to FIGS. 1 and 2, the operation of distillation apparatus 2 will now be described. A liquid sample to be distilled is placed inside flask 36, which in turn is placed inside heating chamber 16. The inlet 40 of flask 6 is connected to the outlet 38 of flask 36. The outlet of flask 6 is connected by coupling 22 to drive tube 24. It should be understood that additional flasks may be connected in series with flask 6. A vacuum source is connected to hose barb 80.

Drive unit 8 is turned on, causing drive tube 24, coupling 22 and the connected flasks 6 and 36 to begin to rotate.

Because drive unit 8 is preferably fan-cooled, it may run continuously with adverse effects for hours at a time, thus enabling a liquid sample to be heated and evaporated very slowly, if desired.

Air oven 4 is turned on and begins to heat the liquid in flask 36. Ice bath 10 is positioned beneath flask 6. As the liquid in flask 36 evaporates, the vapor is drawn into flask 6 where it condenses. Once sufficient vapor has condensed, oven 4 and drive unit 8 may be turned off. Flask 6 may then be disconnected and the condensed liquid removed therefrom.

The foregoing description has been limited to specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed and desired to be secured by Letters Patent of the United States is:

1. Apparatus for distilling or separating a liquid, said apparatus comprising:

an air oven comprising a chamber having a heating element mounted therein, said chamber for receiving a flask containing said liquid, at least one guard arranged around the periphery of said chamber for preventing accidental contact with said chamber, and a thermal isolation bracket to thermally isolate said chamber from a rest surface;

an impeller for circulating air within said chamber, thereby enhancing heating efficiency;

a plurality of flasks connected together in a series, a first one of said series for initially holding said liquid and being disposed within said chamber such that said first flask is connected to a second flask through an aperture; and a drive unit, said unit including a rotary bearing assembly for coupling said series of flasks to a motor for rotating said flasks, said rotary bearing assembly having replaceable parts.

2. The apparatus as in claim 1 wherein said chamber is formed by a seamless, stainless steel canister having an open top and a closed bottom.

3. The apparatus as in claim 1 wherein said chamber includes a sidewall having an aperture disposed therein, said aperture dimensioned and shaped to support an outlet of said first flask such that said first flask may rotate freely.

4. The apparatus as in claim 1 wherein said heating element is mounted in said chamber by a sealed fitting.

5. The apparatus as in claim 1 wherein said impeller is mounted on an interior sidewall of said chamber.

6. The apparatus as in claim 1 wherein said impeller is formed integrally with the outer surface of said first one of said series of flasks. efficiency.

7. The apparatus as in claim 1 wherein the temperature of said oven is controlled in an open loop fashion.

8. The apparatus as in claim 1 further comprising a variable transformer coupled to said heating element for controlling the temperature of said oven.

9. The apparatus as in claim 1 wherein the temperature of said oven is controlled in a closed loop fashion.

10. The apparatus as in claim 1 further comprising a programmable temperature control unit coupled to said heating element for controlling the temperature of said oven.

11. The apparatus as in claim 1 wherein said heating element comprises a sheathed, grounded, helical element.

12. The apparatus as in claim 1 wherein said air oven is supported by a plurality of adjustable feet for modifying the height or angle of said oven with respect to said surface.

13. The apparatus as in claim 1 wherein said drive unit is supported by a plurality of adjustable feet for modifying the height or angle of said drive unit with respect to said surface.

* * * * *